United States Patent [19]
Harvey

[11] 3,763,754
[45] Oct. 9, 1973

[54] FILM PACK WITH RESILIENT WASTE HANDLING MEANS

[75] Inventor: Donald M. Harvey, Webster, N.Y.

[73] Assignee: Eastman Kodak Company, Rochester, N.Y.

[22] Filed: July 5, 1972

[21] Appl. No.: 268,935

[52] U.S. Cl. .................................. 95/19, 95/13
[51] Int. Cl. .................................. G03b 19/10
[58] Field of Search .............. 95/19, 13, 14, 22, 95/30; 206/62 R

[56] References Cited
UNITED STATES PATENTS
3,673,939  7/1972  Harvey ........................ 95/19 X Primary Examiner—Richard L. Moses
Attorney—W. H. J. Kline et al.

[57] ABSTRACT

A film pack for use in a processing camera is loaded with a plurality of film units each including processing materials releasably coupled to an image-recording section. After each film unit has been exposed, it is moved endwise between a pair of processing rollers in the camera for initiating processing of the film unit. Beyond the roller nip, the processing materials are separated from the image-recording section and are guided around one of the rollers to a storage compartment in the film pack casing. A spring member resiliently urges the processing materials against the one processing roller for facilitating delivery of the separated materials to the storage compartment and for retaining such materials in proper position in the storage compartment. When the film pack is removed from the camera, the same spring member urges the separated materials against a surface of the film pack casing for maintaining such materials in proper position.

19 Claims, 7 Drawing Figures

FILM PACK WITH RESILIENT WASTE HANDLING MEANS

BACKGROUND OF THE INVENTION

The present invention relates to film packs loaded with a plurality of self-processing film units each including processing materials releasably coupled to an image-recording or print section. More particularly, the invention is directed to means for facilitating the automatic separation, transportation, and storage of the processing materials.

The invention pertains most directly to film units, packs, and cameras, generally of the type illustrated and described in my U.S. Pat. applications, Ser. No. 111,467 entitled Photographic Apparatus, Ser. No. 111,471 entitled Film Unit, both filed on Feb. 1, 1971 and now abandoned, and Ser. No. 268,940 entitled Film Handling Improvement, filed on even date herewith.

Briefly, the film units include an image-recording or print section and processing materials, such as a container or pod for supplying a processing composition, that are releasably coupled to the image-recording section. The film pack includes an assemblage or plurality of the film units received in a casing, and the camera is provided with means for sequentially exposing and effecting processing of the film units. After the initiation of processing, the separable processing materials are directed around one of the pressure-applying members to a storage compartment in the film pack casing, while the image-recording section moves along a different path separating it from the processing materials and rendering it accessible from the camera exterior. Each successively exposed film unit is processed in the same manner, and the successively separated processing materials are stacked in the storage compartment. After all of the available film units have been exposed and processed, the film pack can be removed from the camera and discarded along with the collected processing materials, thereby eliminating the need for the photographer to handle such materials.

As also is disclosed in or will become apparent from the above-mentioned applications, the mechanisms for transporting the various film unit parts within and from the camera should be capable of accomplishing a variety of functions under different conditions in the transporting and processing cycles. By way of example only, a first feeding mechanism employing reciprocatory movement may be employed for moving the film units from their exposure position into engagement with the pressure-applying members. Then, one or both of the members can be rotated in engagement with the film unit to transport the film unit between and progressively push it beyond the rollers. Finally, an additional or supplemental pusher can be employed to effect the final movement of the processing waste materials into the collecting chamber. Similarly, sprocket teeth, or the like, may be employed with the pressure-applying members for engaging perforations in the film unit to push the processing materials beyond the processing nip and into the storage chamber.

While the above-mentioned mechanisms are considered satisfactory for their intended purposes, still more reliable and less complex mechanisms have been sought, especially for effecting movement of the processing or waste materials beyond the nip between the pressure-applying members when transporting forces become substantially more difficult to apply to the film unit.

SUMMARY OF THE INVENTION

In accordance with the present invention, improved means are provided for facilitating transporting of the exhausted processing materials or other film unit parts beyond the nip between the pressure-applying members without requiring sprockets or additional driving mechanisms. Still further, the same means also can be used for retaining such materials or parts in their storage position when the film pack has been removed from the camera.

An object of the invention is to improve the operation of the above-mentioned types of packs and cameras by providing improved means for maintaining the processing waste materials in resilient engagement with a driving roller comprising one of the pressure-applying members while such materials progressively are moved beyond the nip between the members.

Another object of the invention is to provide improved means for retaining the processing waste materials in the storage compartment of the film pack casing when the film pack is removed from the camera.

An additional object of the invention is to provide means for supporting and guiding the central sections of the processing waste materials as such materials are moved progressively beyond the nip between the pressure-applying members and into the storage compartment.

Still another object of the invention is to accomplish one or more of the above-mentioned objects without requiring additional moving parts or supplemental driving mechanisms in the camera.

A further object of the invention is to achieve the foregoing objectives by simple and reliable means capable of being incorporated in the film pack without significantly complicating or increasing the production costs thereof.

In accordance with a preferred embodiment of the invention, these and other objects are accomplished by providing the film pack casing with resilient means such as a leaf spring for engaging a rotatably driven pressure-applying member at a central location spaced circumferentially around that member from the nip between the members and in the intended path of movement of the processing waste materials. As the waste materials are directed around the driven member, they enter between that member and the resilient means for increasing the frictional pressure tending to drive the waste materials into the storage compartment while also aiding in guiding the materials along their intended movement path. After entering the storage compartment, further movement of the processing materials is blocked with their trailing ends still held in contact with the driven pressure member to retain the materials in their stored position. When the exhausted film pack is removed from the camera, the same resilient means then urges the waste materials against an edge surface of the casing and thereby continues to maintain the waste materials in their proper stored position.

Various means for practicing the invention and other advantages and novel features thereof will be apparent from the following detailed description of an illustrative preferred embodiment of the invention, reference being made to the accompanying drawings in which like reference characters denote like elements.

DESCRIPTION OF THE ILLUSTRATIVE PREFERRED EMBODIMENT

Because processing cameras and self-processing film units are well known, the present description will be directed in particular to elements forming part of or cooperating more directly with the present invention. Camera and film elements not specifically shown or described herein are selectable from those known in the prior art.

The illustrative film unit 10 depicted in FIGS. 1 – 7 of the accompanying drawings comprises an image-recording or print section 12, processing materials such as a fluid container or pod 14, and a carrier sheet 16 including means for releasably coupling the container or pod to the image-recording section.

Figure 1:
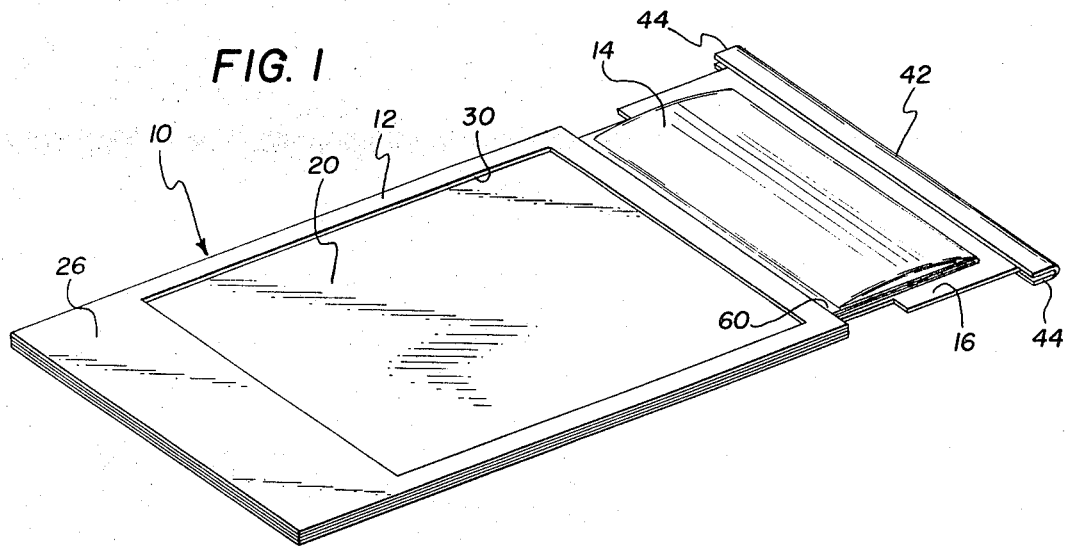
FIG. 1 is a perspective view of a self-processing film unit usable with the present invention.
Figure 2:
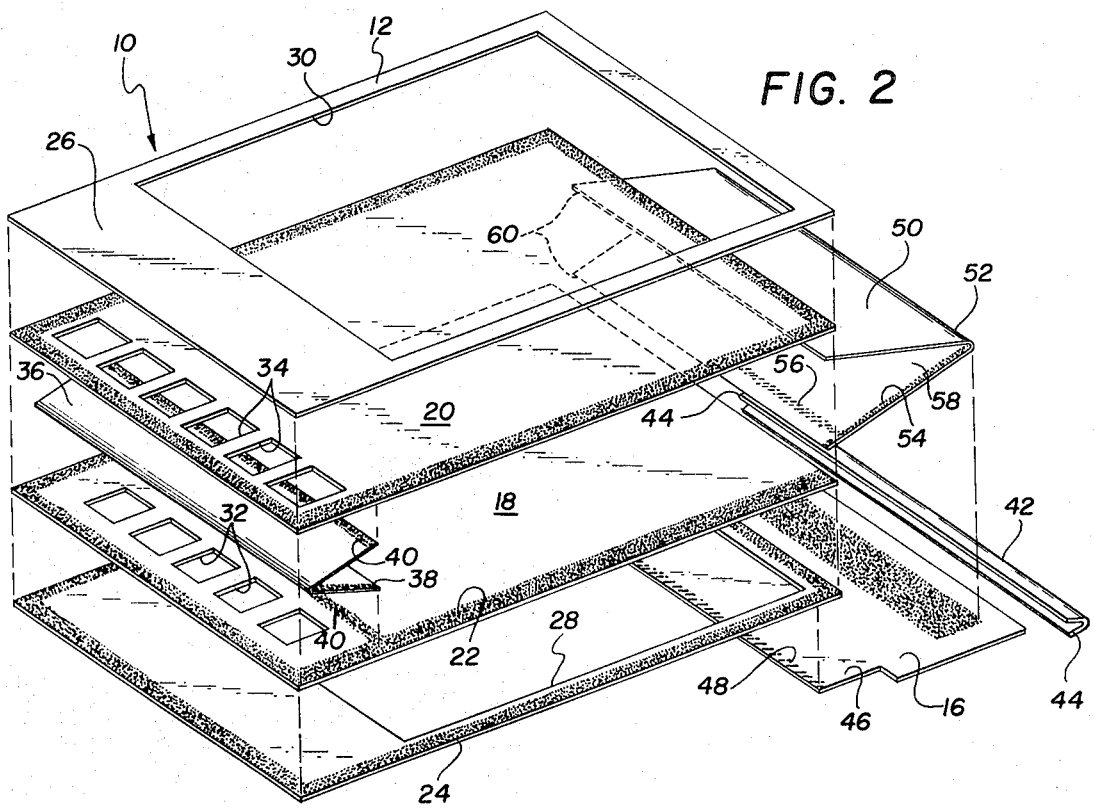
FIG. 2 is an exploded view of the film unit depicted in FIG. 1.

As best illustrated in FIG. 2, the image-recording section comprises a photosensitive element or first sheet 18 and a transparent cover or process sheet 20 that are permanently secured together along their lateral and trailing edges as shown by the shaded areas 22 in that figure. For purposes of clarity, permanent connections between the different elements of the film unit are depicted by areas shaded with dots and separable connections are illustrated by areas shaded with dashes. Mask sheets 24 and 26 are permanently bonded to the corresponding outer faces of the photosensitive and process sheets and include respective openings 28 and 30 that define the image or picture area of the image-recording section. The trailing end portions of the two sheets 18 and 20 are provided with respective rectangular openings 32 and 34 that are staggered relative to each other so that each opening 32 straddles the separating bar between two of the confronting openings 34. A very thin sheet of moisture resistant material 36 is folded and cemented to itself along its lateral edges 38 and is bonded to the confronting surfaces of the photosensitive and process sheets along its leading edges as shown by bonding areas 40. Sheet 36 thus forms an envelope that is open at its leading end to receive excess processing fluid driven beyond the picture area of the recording section during the processing operation. Because the envelope provided by sheet 36 lies between the opposed openings 32 and 34 in the two sheets 18 and 20, the envelope can expand slightly into those openings to accommodate the excess processing fluid. The staggered alignment of openings 32 and 34 tends to prevent the fluid from being squeezed out of the trap by accidental finger pressure. This particular type of image-recording or print section is designated as a preregistered integral unit with a permanently attached trap. The term "preregistered" refers to the fact that the photosensitive sheet and the process sheet are superposed or registered prior to exposure, preferably at some stage during the manufacture of the film unit, and the term "integral" to the fact that the two sheets are permanently maintained in superposed or registered relation after processing.

The carrier sheet 16 of the film unit is made of resilient sheet material, preferably plastic, and is permanently attached at its leading end to a transverse metal stiffener bar 42 of the type disclosed in greater detail in my aforementioned U.S. Pat. application, Ser. No. 268,940 entitled Film Handling Improvement, filed on even date herewith. The tips 44 of the stiffener bar extend beyond the lateral edges of the carrier sheet, the leading end of which is substantially the same width as the image-recording section. The trailing end of the carrier sheet is preferably cut to define a tongue 46 that is narrower than the width of the image-recording section. This tongue, in turn, is separably bonded to that section by means of a rupturable adhesive 48, or the like, applied to the trailing end surface of the tongue confronting the corresponding portion of mask sheet 24.

The two sheets 18 and 20 of the image-recording section are rectangular and coextensive with one another and are permanently joined along their lateral edges or margins, as previously mentioned, whereby their central exposure regions are maintained in registration but may be spread apart sufficiently to permit the distribution of a processing composition or fluid therebetween. The photosensitive sheet is exposed through the transparent process sheet and, after processing, the final image or print is viewed from the opposite side, thus providing a positive right-reading image without recourse to image-reversing mirrors or the like in the camera. Further details of such a film unit are illustrated and described in German Offenlegungschrift No. 2,052,145, published Ap. 29, 1971.

The container or pod 14 that initially contains the processing fluid composition is permanently cemented to the carrier sheet 16 between the leading end of the image-recording section and the stiffening bar at the leading end of the carrier sheet. As best depicted in FIG. 2, the processing fluid pod comprises a single sheet 50 of a tough, vapor-impervious material that is chemically inert to the relatively caustic processing fluid, representative examples of which are disclosed in a number of patent references well known to those skilled in the art of self-processing cameras. Typically, the pod sheet 50 comprises a web of paper or plastic laminated to a thin layer of lead foil. Sheet 50 is folded along one edge as shown at numeral 52 and is sealed along its lateral margins 54 by a permanent cement or adhesive or by means of an appropriate heat sealing operation or the equivalent. A rupturable or separable transverse joint or seal 56 extends between the permanently sealed margins 54 of sheet 50, thus defining a rupturable separation between the processing fluid chamber 58 and the funnel portion 60 of the pod. The pod funnel 60, in turn, is inserted between the leading edges of the photosensitive and process sheets but is not cemented or otherwise mechanically attached directly to either sheet. When the processing fluid pod passes through the nip between two opposed pressure members in the camera, the resulting hydraulic forces developed within chamber 58 cause joint 56 to rupture so that the processing fluid is delivered between the two sheets of the image-recording section through funnel 60 and is distributed across the exposed image on the photosensitive sheet. As previously described, excess processing fluid driven beyond the exposed image is collected in the envelope or chamber provided by trap sheet 36.

Figure 3:
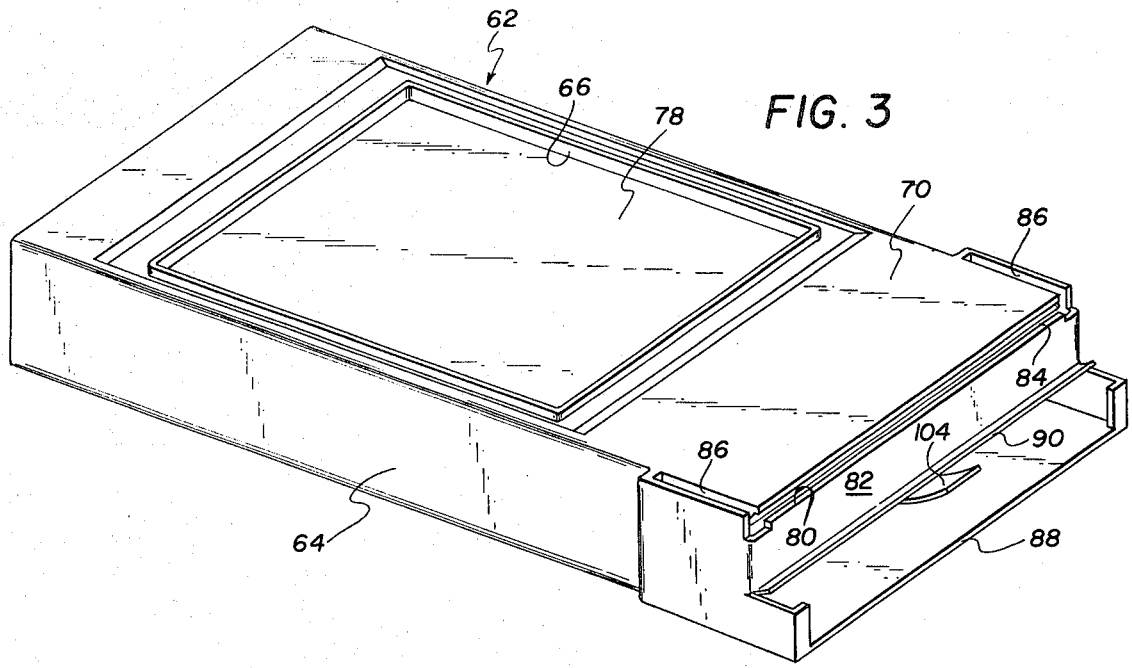
FIG. 3 is a perspective view of a film pack containing a plurality of the film units depicted in FIGS. 1 and 2.
Figure 5:
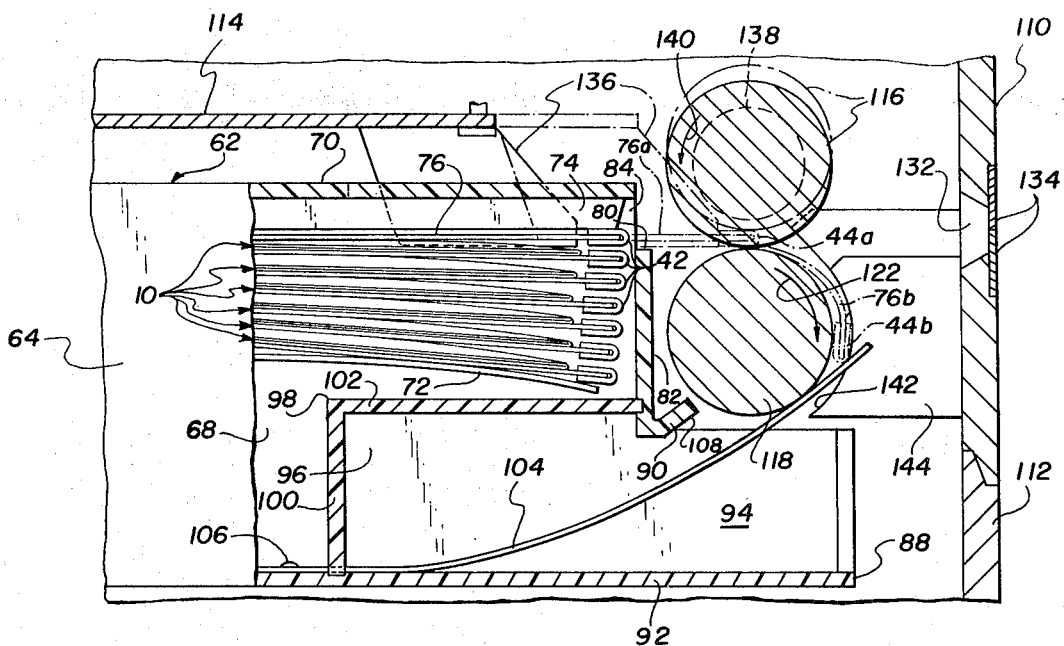
FIGS. 5 – 7 are enlarged side elevational views of a portion of the structure depicted in FIG. 4 partially cross-sectioned along line 5—5 of that figure, showing the manner in which processing waste materials are successively delivered into a storage compartment and retained in stored position in accordance with the invention.
Figure 6:
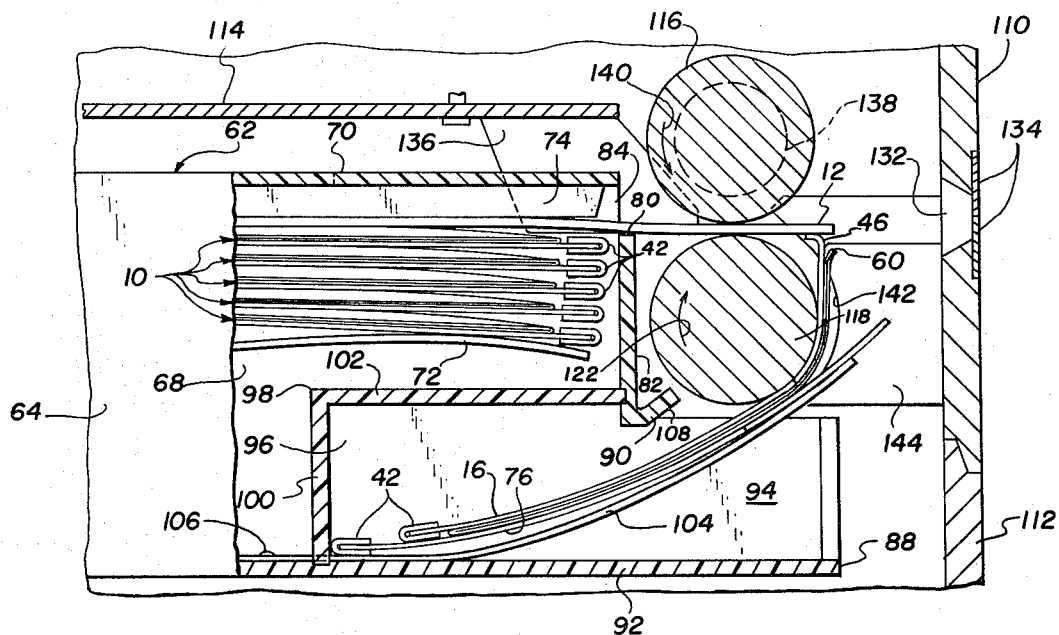
Figure 7:
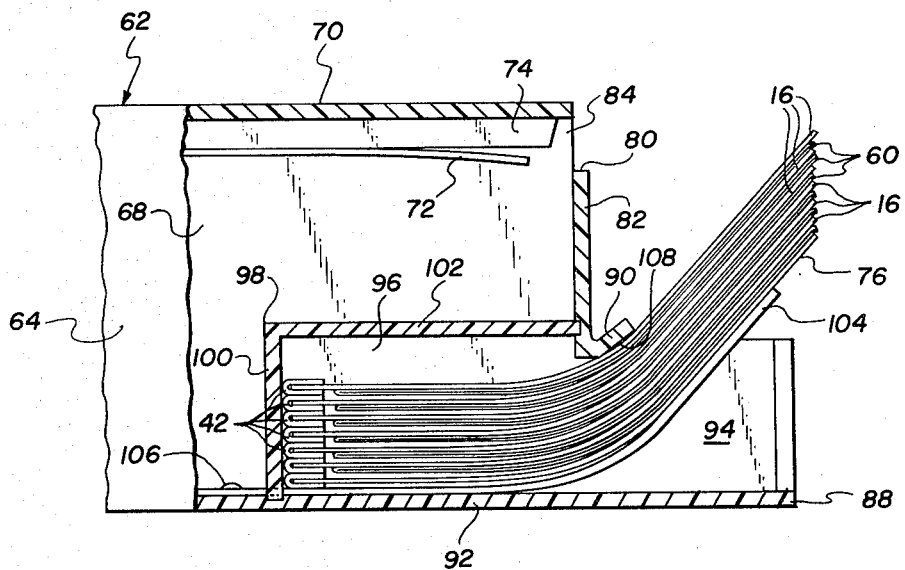

A plurality of film units of the type described above are supplied in a film pack or magazine 62, best illustrated in FIG. 3. The box-like casing 64 of the film pack is made of plastic or sheet metal and includes a forwardly facing exposure window 66. The film units 10 are initially housed in stacked relation in film compartment 68, as shown in FIG. 5, with their image-recording sections in alignment with exposure window 66. A spring-loaded pressure plate is located behind the film units in the film compartment and is biased forwardly to compress the stack of film units against the front wall 70 of the casing. A support spring 72, shown in FIGS. 5 – 7, is carried by the pressure plate and resiliently urges the pod portions of the film units forwardly against guide rails 74 carried by the front casing wall 70. Initially, an opaque cover element is located forwardly of the forwardmost film unit to protect that unit from ambient light. This cover element is substantially identical to the film units except that no pod is provided on its carrier sheet 76 and an opaque disposable card 78 is substituted for the image-recording section. The forward edge 80 of the casing end wall 82 is located slightly rearwardly of the plane defined by the cover element or the forwardmost film unit to permit that cover element or film unit to be moved endwise out of the casing through exit opening 84. A pair of longitudinal slots 86 in the front casing wall join opening 84 and allow a feeder mechanism to engage the stiffener bar of the cover element or the forwardmost film unit to initiate its endwise movement out of the casing.

As shown in FIG. 3, the leading end portion of the film pack casing is sufficiently wide to accommodate the stiffener bars of the cover element and the film units, and the remainder of the casing conforms to the width of the image-recording sections to maintain the film units in stacked alignment with each other in the film compartment.

Behind the portion of the film pack initially containing the film unit pods, the film pack casing extends beyond end wall 82 to provide a chute or porch 88. As shown in FIGS. 5-7, lip 90 along the rearward edge of casing end wall 82 is spaced from the back casing wall 92 to provide an entrance opening 94 through which processing waste elements of the film units can be inserted into an internal storage compartment 96 defined by an internal casing element 98 comprising an internal end wall 100 and an internal central wall 102. In accordance with a preferred embodiment of the present invention, a leaf spring member 104 is centrally located within the storage compartment 96 and is attached to the back casing wall 92 by means of a rivet 106 or the equivalent. As described in detail below, spring 104 extends through the entrance opening to the storage compartment and is bowed forwardly so that its inherent resiliency urges it toward clamping surface 108 along the rearward edge of casing tip 90.

Figure 4:
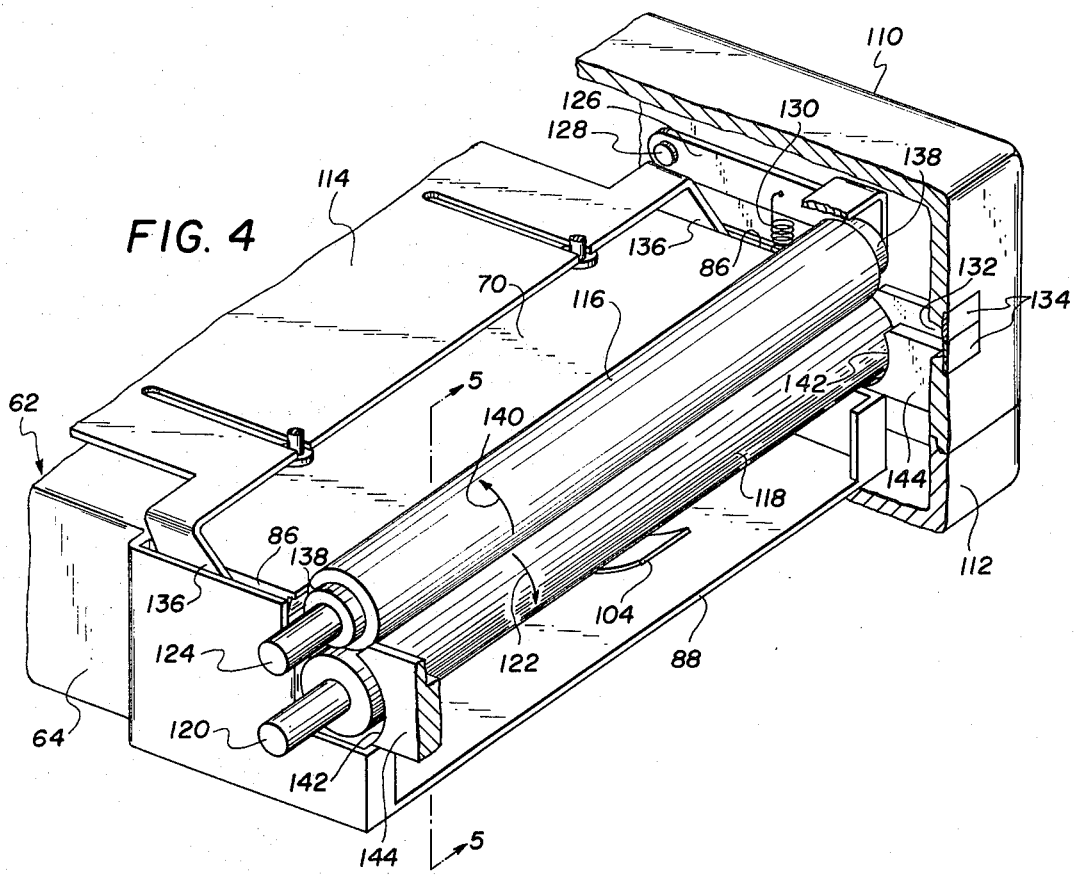
FIG. 4 is a perspective view illustrating the relation of the film pack to the basic components of a processing camera in which the film pack is installed.

The housing of a camera adapted to use the illustrative film pack is partially depicted at numeral 110 in FIGS. 4 – 6 and is provided with a hinged rearward cover door 112 that can be opened to permit insertion of the film pack into the housing. Within the housing, the camera contains a processing mechanism including a slidably supported feeder plate 114 and a pair of processing rollers 116 and 118. The rearward or drive roller 118 is rotatably supported in fixed relation to the camera housing by its end shafts 120 and is adapted to be driven in the direction shown by arrow 122 by an appropriate drive mechanism, not shown. The end shafts 124 of the forward roller 116 are carried by a bracket partially shown at numeral 126, which is pivotally attached to the camera housing by pins 128. A pair of relatively strong springs 130 bias bracket 126 rearwardly to provide a firm but yieldable pressure at the roller nip, which is aligned with a slot 132 in the adjacent end wall of the camera housing. A pair of resilient flaps 134 cover slot 132 to prevent light or foreign materials from entering the camera housing through that slot.

When the film pack is in its illustrated loaded position within the camera housing, it is engaged by appropriate support surfaces, not shown, whereby the photosensitive surface of a film unit exposable through the exposure window 66 is located in coincidence with the focal plane of the camera lens. This location of the film pack within the camera housing also aligns the cover element or forwardmost film unit with the nip between the two processing rollers and causes fingers 136 of feeder plate 114 to extend into the film compartment through slots 86 as shown in solid lines in FIGS. 4 and 5.

After the film pack has been loaded into the camera and the cover door has been closed, but before the first available film unit can be exposed, energization of the processing mechanism causes the feeder plate to move fingers 136 to the position shown in broken lines in FIG. 5 and to initiate the rotation of roller 118 in the direction shown by arrow 122. Because specific details of the drive mechanism that actuates the feeder plate and the drive roller are not necessary to understanding the invention, such details have been omitted from the present disclosure. Suitable means adapted to perform those functions and other related functions are disclosed, for example, in my U.S. Pat. application Ser. No. 268,937 entitled Photographic Apparatus, filed on even date herewith.

As fingers 136 move from the position shown in solid lines to the position shown in broken lines in FIG. 5, they engage the trailing edges of the tips 44 of the stiffener bar attached to the leading end of the cover element and thereby force the cover element endwise to introduce that bar into the roller nip as shown at numeral 44a. By reference to FIG. 4, it will be seen that the forward roller 116 is provided with reduced-diameter segments 138 at its opposite ends to allow fingers 136 to drive the stiffener bar completely into the roller nip. As soon as the stiffener bar has entered the nip, the rotation of roller 118 drives the bar through the nip as roller 116 is concurrently rotated in the opposite direction shown by arrow 140. Beyond the roller nip, the tips of the stiffener bar encounter the arcuate faces 142 of deflecting fenders or guide shoes 144, which direct the bar rearwardly around roller 118 as the cover element continues to be driven through the nip by frictional engagement with the rollers. Further details of these guide shoes and the manner in which they function are disclosed in my previously mentioned U.S. Pat. applications, Ser. No. 111,467 and Ser. No. 268,940. The stiffener bar is therefore driven between roller 118 and spring member 104 as shown at numeral 44b in FIG. 5 and slides along that spring into the storage compartment. When the leading end of the cover member card 78 emerges through the roller nip, its inherent stiffness causes it to continue moving in a generally flat plane between guide shoes 144 and into housing slot 132. Consequently, the connection between the cover element carrier sheet 76 and card 78 is peeled apart and roller 118 continues to drive the latter carrier sheet into the film compartment because of the frictional contact maintained between the carrier sheet and roller 118 by spring 104. When the stiffener bar at the leading end of the carrier sheet encounters wall 100 of the storage compartment, the carrier sheet ceases its endwise movement and roller 118 simply slips against the confronting carrier sheet surface. Thereupon, the drive mechanism discontinues rotation of roller 118 and returns the feeder plate to its initial position, and the pressure plate moves the stack of film units forwardly to locate the forwardmost film unit in proper position for exposure.

After the forwardmost film unit has been exposed, the drive mechanism is again energized and performs in exactly the same manner described above to feed the stiffener bar of that film unit into the nip between the rotating rollers. The subsequent movement of the pod through the roller nip produces internal hydraulic pressure that ruptures the pod seal 56 along the funnel portion of the pod and allows the processing fluid to be squeezed out of the pod and through the funnel so that it enters the image-recording section between the leading edges of the photosensitive sheet and the process sheet. The stiffener bar of the film unit encounters the trailing tongue 46 of the preceding carrier sheet 76 straddled by guide shoes 144 and is driven between that sheet and the drive roller so that it moves into the storage compartment along the forwardly facing surface of that sheet. The stiffness of the image-recording section causes it to separate from the carrier sheet and funnel of the corresponding pod assembly, as shown in FIG. 6, so that the section emerges through slot 132 between flaps 134 as the carrier sheet continues to be propelled into the storage compartment until its stiffening bar abuts against internal wall 100. Before such abutment occurs, the tongue 46 of the carrier sheet is straddled by the guide shoes 144 so that the trailing portion of that sheet extends between the shoes in tangential relation to roller 118, as shown in FIG. 6. Because the carrier sheet of the cover member remains gripped between spring 104 and roller 118 until the stiffening bar of the forwardmost film unit is driven between that sheet and the roller, it will be seen that jarring or shaking of the camera cannot dislodge carrier sheet 76 from the position at which it will properly guide the succeeding carrier sheet into the storage compartment. Also because spring 104 is centrally located with respect to roller 118, its resilient force tends to prevent bending or buckling of the carrier sheets as they are delivered into the storage compartment.

By repeating the same operations of the rollers and the feeder plate following the exposure of each successive film unit, all of the waste elements of the film units are delivered to the storage compartment in stacked relation, thereby eliminating any need for the photographer to handle those elements. When the exhausted film pack is removed from the camera, spring 104 biases the entire stack of carrier sheets and exhausted pods into resilient contact with clamping surface 108 along lip 90 of the film pack casing, as shown in FIG. 7, whereby those elements are not subject to falling out of the disposable casing or to being accidentally withdrawn therefrom.

Although the terms "forward" and "rearward" have been used in describing the two processing rollers and other elements of the illustrative embodiment of the invention, it will be understood that those terms are used only with reference to the front and back aspects of the film pack rather than the camera, inasmuch as the "front" wall of the film pack might face rearwardly in a camera of the type providing a folded optical path between camera lens and the film plane.

The invention has been described in detail with particular reference to an illustrative preferred embodiment thereof, but it will be understood that variations and modifications can be effected within the spirit and scope of the invention as described hereinabove and as defined in the appended claims.

I claim:

1. A film pack for use in a processing camera, the camera including a rotatably driven roller, and the film pack comprising:

a first chamber section for receiving a plurality of unconnected film units, said first chamber section including means defining an aperture permitting the exposure of film units in said first chamber section and an exit opening through which the film units are removable from said first chamber section after their exposure;

a second chamber section for receiving at least a portion of the film units removed from said first chamber section, said second chamber section including means defining an entrance opening through which the film unit portions are movable into said second chamber section along a path extending between said exit and entrance openings around the driven roller; and means attached to said film pack for engaging the film unit portions adjacent said entrance opening as they are moved in said path between said exit and entrance openings and for resiliently urging the engaged portion against the rotatably driven roller to effect driving engagement between said portions and the roller.

2. A film pack as claimed in claim 1, wherein said means comprises a leaf spring extending from said second chamber section outwardly through said entrance opening.

3. A film pack as claimed in claim 2, wherein said film pack defines a lateral direction normal to the direction the film unit is removable through said exit opening, and wherein said leaf spring is centrally located relative to said film pack in said lateral direction for aiding in guiding the film unit portions into said second chamber section.

4. A film pack as claimed in claim 1, including an end wall between said exit and entrance openings, and wherein said means is located and arranged to resiliently urge any film unit portions in said second chamber section into holding engagement with said end wall when said film pack is removed from the camera.

5. A film pack for supplying a plurality of film units to a processing camera; the film units each including a first part for recording a visibly presentable image and a second part separably coupled to the first part for aiding in the establishment of that image; the camera including a rotatably driveable pressure-applying member, a second pressure-applying menber juxtaposed with the rotatably driveable member to define a nip between the members for applying compressive pressure to the film unit, and deflecting means for bending the second part of the film unit into a movement path extending around the rotatably driveable member; said film pack comprising:

a casing defining an exposure aperture, said casing including a first compartment having means for locating the film units in a position to be exposed through said aperture, and a second compartment located generally behind said first compartment relative to said aperture and having means for receiving the second parts of the film units in stacked relation, said first compartment having an exit aperture through which the film units are removable from said first compartment for movement between the pressure-applying members, said second compartment having an entrance aperture through which the second parts of the film units are insertable into said second compartment from the movement path extending around the rotatably driveable member; and engagement means attached to said casing for resiliently urging the second parts of the film units into engagement with the driveable member at an engagement location spaced around the member from the nip between the members to increase the driving force transferred to the film unit by the driveable member at the engagement location.

6. A film pack as claimed in claim 5, wherein the engagement location is spaced around said driveable member by more than ninety degrees from the nip between the pressure-applying members.

7. A film pack as claimed in claim 6, wherein said engagement means extends outwardly of said casing from said second compartment.

8. A film pack as claimed in claim 5, wherein said entrance aperture is defined in part by a wall of said casing and said engagement means is located and arranged for resiliently urging the second parts of the film units into engagement with said wall to maintain the second film unit parts in said second compartment after said film pack is removed from the camera.

9. In a film pack for receiving a plurality of self-processing film units, the film units initially being housed in stacked relation in a box-like casing provided with an exit opening through which successive ones of the film units are removable from said casing for processing and an entrance opening through which a waste element of each of the film units is movable into a storage compartment in said casing to store said waste elements in stacked relation, said film pack being adapted for use in a self-processing camera including a rotatable processing roller cooperating with guide means engageable with said waste element of a film unit being removed from said casing to direct that element partially around said roller toward said entrance opening in said storage compartment; the improvement comprising a resilient member carried by said casing and resiliently biased toward said roller when said film pack is loaded into said camera to resiliently urge a waste element partially encircling said roller into frictional engagement with said roller.

10. The improvement claimed in claim 9, wherein said resilient member establishes guide means for assisting in guiding the laterally central portion of the waste element encircling said roller along a predetermined path into said storage compartment through said entrance opening.

11. The improvement claimed in claim 9, wherein said resilient member comprises an elongate leaf spring located centrally of said casing and extending into said storage compartment.

12. The improvement claimed in claim 9, wherein said casing includes means defining a clamping surface confronting said resilient member adjacent said entrance opening, said resilient member being adapted to resiliently sandwich the stack of stored waste elements between said resilient member and said clamping surface when said film pack is removed from said camera after the film units initially housed therein have been processed.

13. Photographic apparatus for use with a self-processing film unit, the film unit including a first part for recording a visibly presentable image and a second part for aiding in the establishment of that image, said apparatus comprising:

a casing including means defining a first portion for receiving the film unit in a position for exposure and a second portion for receiving the second part of the film unit after exposure of the film unit;

a pair of juxtaposed pressure-applying members defining a nip therebetween for engaging and applying compressive pressure to the film unit, one of said pressure-applying members being rotatably driveable;

a transporting mechanism for moving the film unit from said first portion of said casing and between said pressure-applying members, said mechanism including means for rotatably driving said one pressure-applying member in engagement with the film unit to push the film unit through said nip between said members;

means for deflecting the second part of the film unit into a movement path extending around said one pressure-applying member and toward said second portion of said casing; and a force-applying element resiliently urged into engagement with said one pressure-applying member at an engagement location spaced around said one member from said nip, said element lying in said movement path of the second film unit part to increase the driving force exerted on the second part by said driveable roller at said engagement location.

14. Photographic apparatus as claimed in claim 13, wherein the first and second parts of the film unit are separably coupled, and said deflecting means is effective to separate said second part from said first part.

15. Photographic apparatus as claimed in claim 13, wherein said deflecting means comprises a pair of spaced deflecting fenders extending around said one pressure-applying member for engaging the lateral edges of the second part of the film unit, and said engagement location of said force-applying element lies generally between said fenders.

16. Photographic apparatus as claimed in claim 15, wherein said force-applying element comprises a leaf spring extending from said second portion of said casing to said engagement location and beyond said engagement location between said fenders.

17. A film pack for supplying a plurality of self-processing film units to a processing camera; the camera including means for sequentially exposing the film units, a pair of juxtaposed pressure-applying rollers drivable in engagement with the film units for initiating processing of the film units as each film unit is exposed and for pushing the film units in a first direction extending tangentially from between the rollers, and deflecting means for bending at least a portion of the film units away from the first direction into an arcuate movement path extending around one of the pressure-applying rollers; said film pack comprising:

a casing including a first compartment for receiving the film units prior to their exposure and a second compartment for receiving at least the film unit portion of each film unit after its processing, said first compartment including means for defining an exposure aperture through which the film units sequentially are exposable and an exit aperture through which the exposed film units sequentially are removable from the first compartment, said second compartment including means for defining an entrance through which at least the portions of the removed film units are insertable into the second compartment; and guiding means permanently attached to said casing in said second compartment for cooperating with the camera deflecting means to extend the arcuate movement path into said second compartment said guiding means including a guide surface located to be engaged by the film unit portions adjacent the one pressure-applying roller and to guide the film unit portions in the arcuate movement path beyond the camera deflecting means.

18. A cartridge adapted to contain a plurality of film units, wherein each of said film units includes an imagerecording portion and an element that can be separated from the image-recording portion and constitute waste that must be disposed of, said cartridge comprising first and second generally opposed side walls, a pair of edge walls, first and second end walls, said first side wall having an exposure aperture therethrough, a film unit exit slot disposed in said first end wall, means forming a separated element receiver in said first end wall, and guide means in said cartridge arranged to engage and guide said separated element into said receiver.

19. A cartridge as claimed in claim 18 wherein said guide means is formed by a spring member in said receiver.

* * * * *